United States Patent
Ishibashi et al.

(10) Patent No.: US 7,649,531 B2
(45) Date of Patent: Jan. 19, 2010

(54) IMAGE GENERATION DEVICE AND IMAGE GENERATION METHOD

(75) Inventors: Yudai Ishibashi, Osaka (JP); Tadashi Kobayashi, Osaka (JP); Makoto Yamakura, Osaka (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 11/630,102

(22) PCT Filed: Sep. 6, 2005

(86) PCT No.: PCT/JP2005/016334

§ 371 (c)(1),
(2), (4) Date: Dec. 20, 2006

(87) PCT Pub. No.: WO2006/028093

PCT Pub. Date: Mar. 16, 2006

(65) Prior Publication Data
US 2008/0055309 A1    Mar. 6, 2008

(30) Foreign Application Priority Data
Sep. 6, 2004   (JP) .............................. 2004-257914

(51) Int. Cl.
*G06T 15/00* (2006.01)
(52) U.S. Cl. ........................ 345/419; 345/421; 345/422; 345/423; 345/426; 345/427; 345/501; 345/545; 345/582; 345/589; 345/620
(58) Field of Classification Search ................. 345/419, 345/421, 422, 426, 501, 582, 589, 545, 620, 345/441, 423, 427
See application file for complete search history.

(56) References Cited

U.S. PATENT DOCUMENTS 5,933,156 A * 8/1999 Margolin ..................... 345/545

(Continued)

FOREIGN PATENT DOCUMENTS

CN    1252578    5/2000

(Continued)

OTHER PUBLICATIONS

Partial English translation of JP 2003-281564, which was previously cited in the IDS filed Dec. 20, 2006.

(Continued)

*Primary Examiner*—Kimbinh T Nguyen
(74) *Attorney, Agent, or Firm*—Wenderoth, Lind & Ponack L.L.P.

(57) ABSTRACT

An image generation device includes a memory in which a burst length, which is the smallest unit of read/write processing, is large; and an image generation device in which processing efficiency at the time of a memory access does not decrease, even in the case of accessing a rendering buffer for rendering a polygon. Image data is stored in a rendering buffer in block units made up of plural pixels, and image data of pixels corresponding to the polygon is stored in a serial region of the rendering buffer. A valid pixel flag indicating that a valid pixel is present within the block is stored in the rendering information buffer. The rendering buffer is accessed as little as possible based on placement of the valid pixel flags within the block.

8 Claims, 11 Drawing Sheets

U.S. PATENT DOCUMENTS

| | | | |
|---|---|---|---|
| 6,071,193 A * | 6/2000 | Suzuoki | 463/31 |
| 6,075,899 A | 6/2000 | Yoshioka et al. | |
| 6,091,428 A * | 7/2000 | Piazza et al. | 345/545 |
| 6,239,809 B1 * | 5/2001 | Morioka et al. | 345/422 |
| 2007/0165035 A1 * | 7/2007 | Duluk et al. | 345/506 |

FOREIGN PATENT DOCUMENTS

| | | |
|---|---|---|
| JP | 10-40412 | 2/1998 |
| JP | 10-214353 | 8/1998 |
| JP | 2003-281564 | 10/2003 |

OTHER PUBLICATIONS

Partial English translation of JP 10-40412, which was previously cited in the IDS filed Dec. 20, 2006.

Araya, Shinji, "*Meikai Sanjigen Conpyuta Gurafikkusu (Three-Dimensional Computer Graphics Explained)*", 2003, Kyoritsu Publishing and its English translation.

\* cited by examiner

FIG. 2A

| | | | | | | | | |
|---|---|---|---|---|---|---|---|---|
| [0-7] | ∞ | ∞ | ∞ | ∞ | ∞ | ∞ | ∞ | ∞ |
| [8-15] | ∞ | ∞ | ∞ | ∞ | ∞ | ∞ | ∞ | ∞ |
| [16-23] | ∞ | ∞ | ∞ | 38 | 35 | ∞ | ∞ | ∞ |
| [24-31] | ∞ | ∞ | 44 | 40 | 37 | ∞ | ∞ | ∞ |
| [32-39] | ∞ | 47 | 45 | 42 | 40 | ∞ | ∞ | ∞ |
| [40-47] | ∞ | ∞ | ∞ | 44 | 43 | ∞ | ∞ | ∞ |
| [48-55] | ∞ | ∞ | ∞ | ∞ | ∞ | ∞ | ∞ | ∞ |
| [56-63] | ∞ | ∞ | ∞ | ∞ | ∞ | ∞ | ∞ | ∞ |

901

Prior Art

FIG. 2B 901  902

| | | | | | | | | |
|---|---|---|---|---|---|---|---|---|
| | ∞ | ∞ | ∞ | ∞ | ∞ | ∞ | ∞ | ∞ |
| | ∞ | ∞ | ∞ | ∞ | ∞ | ∞ | ∞ | ∞ |
| | ∞ | ∞ | ∞ | 38 | 35 | 50 | 58 | ∞ |
| | ∞ | ∞ | 33 | 39 | 37 | 51 | 57 | ∞ |
| | ∞ | 47 | 45 | 40 | 40 | 53 | ∞ | ∞ |
| | ∞ | ∞ | ∞ | 44 | 43 | 55 | ∞ | ∞ |
| | ∞ | ∞ | ∞ | ∞ | ∞ | 57 | ∞ | ∞ |
| | ∞ | ∞ | ∞ | ∞ | ∞ | ∞ | ∞ | ∞ |

Prior Art

FIG. 2C

| Frame Buffer | 0 | 0 | --- | 0 | 0 | 35 | 32 | 30 | 0 | 0 | 0 | --- | 0 | 0 |
|---|---|---|---|---|---|---|---|---|---|---|---|---|---|---|
| Z Buffer | ∞ | ∞ | --- | ∞ | ∞ | 44 | 40 | 37 | ∞ | ∞ | ∞ | --- | ∞ | ∞ |
| Memory Address | 0 | 1 | --- | 24 | 25 | 26 | 27 | 28 | 29 | 30 | 31 | --- | 62 | 63 |

Prior Art

FIG. 2D

| Frame Buffer | 0 | 0 | --- | 0 | 0 | 70 | 75 | 80 | 84 | 89 | 0 | --- | 0 | 0 |
|---|---|---|---|---|---|---|---|---|---|---|---|---|---|---|
| Z Buffer | ∞ | ∞ | --- | ∞ | ∞ | 33 | 39 | 45 | 51 | 57 | ∞ | --- | ∞ | ∞ |
| Memory Address | 0 | 1 | --- | 24 | 25 | 26 | 27 | 28 | 29 | 30 | 31 | --- | 62 | 63 |

Prior Art

FIG. 2E

| Frame Buffer | 0 | 0 | --- | 0 | 0 | 70 | 75 | 30 | 84 | 89 | 0 | --- | 0 | 0 |
|---|---|---|---|---|---|---|---|---|---|---|---|---|---|---|
| Z Buffer | ∞ | ∞ | --- | ∞ | ∞ | 33 | 39 | 37 | 51 | 57 | ∞ | --- | ∞ | ∞ |
| Memory Address | 0 | 1 | --- | 24 | 25 | 26 | 27 | 28 | 29 | 30 | 31 | --- | 62 | 63 |

Prior Art

| Color Value | 31 | 28 | 35 | 32 | 30 | 39 | 37 | 34 | 32 | 35 | 34 | --- | | | |
|---|---|---|---|---|---|---|---|---|---|---|---|---|---|---|---|
| Z Value | 38 | 35 | 44 | 40 | 37 | 47 | 45 | 42 | 40 | 44 | 43 | --- | | | |
| Memory Address | 0 | 1 | 2 | 3 | 4 | 5 | 6 | 7 | 8 | 9 | 10 | --- | 61 | 62 | 63 |

| Color Value | 83 | 90 | 70 | 75 | 79 | 84 | 89 | 76 | 80 | 86 | 81 | 88 | 89 | --- | | |
|---|---|---|---|---|---|---|---|---|---|---|---|---|---|---|---|---|
| Z Value | 50 | 58 | 33 | 39 | 45 | 51 | 57 | 40 | 46 | 53 | 47 | 55 | 57 | --- | | |
| Memory Address | 0 | 1 | 2 | 3 | 4 | 5 | 6 | 7 | 8 | 9 | 10 | 11 | 12 | --- | 62 | 63 |

| Color Value | 31 | 28 | 83 | 90 | 70 | 75 | 30 | 84 | --- | 88 | 89 | | --- | | | |
|---|---|---|---|---|---|---|---|---|---|---|---|---|---|---|---|---|
| Z Value | 38 | 35 | 50 | 58 | 33 | 39 | 37 | 51 | --- | 55 | 57 | | --- | | | |
| Memory Address | 0 | 1 | 2 | 3 | 4 | 5 | 6 | 7 | | 16 | 17 | 18 | --- | 61 | 62 | 63 |

Valid Pixel Data Region | Unused Region

FIG. 6A

|          | 0 | 0 | 0 | 0 | 0 | 0 | 0 | 0 |
|----------|---|---|---|---|---|---|---|---|
| [0-7]    | 0 | 0 | 0 | 0 | 0 | 0 | 0 | 0 |
| [8-15]   | 0 | 0 | 0 | 0 | 0 | 0 | 0 | 0 |
| [16-23]  | 0 | 0 | 0 | 0 | 0 | 0 | 0 | 0 |
| [24-31]  | 0 | 0 | 0 | 0 | 0 | 0 | 0 | 0 |
| [32-39]  | 0 | 0 | 0 | 0 | 0 | 0 | 0 | 0 |
| [40-47]  | 0 | 0 | 0 | 0 | 0 | 0 | 0 | 0 |
| [48-55]  | 0 | 0 | 0 | 0 | 0 | 0 | 0 | 0 |
| [56-63]  | 0 | 0 | 0 | 0 | 0 | 0 | 0 | 0 |

FIG. 6B

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 1 | 1 | 0 | 0 | 0 |
| 0 | 0 | 1 | 1 | 1 | 0 | 0 | 0 |
| 0 | 1 | 1 | 1 | 1 | 0 | 0 | 0 |
| 0 | 0 | 0 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |

FIG. 6C

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 1 | 1 | 0 |
| 0 | 0 | 1 | 1 | 1 | 1 | 1 | 0 |
| 0 | 0 | 0 | 1 | 1 | 1 | 0 | 0 |
| 0 | 0 | 0 | 0 | 1 | 1 | 0 | 0 |
| 0 | 0 | 0 | 0 | 0 | 1 | 0 | 0 |
| 0 | 0 | 0 | 0 | 0 | 0 | 0 | 0 |

FIG. 6D

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 1 | 1 | 1 | 1 | 0 |
| 0 | 0 | 1 | 1 | 1 | 1 | 1 | 0 |
| 0 | 1 | 1 | 1 | 1 | 1 | 0 | 0 |
| 0 | 0 | 0 | 1 | 1 | 1 | 0 | 0 |
| 0 | 0 | 0 | 0 | 0 | 1 | 0 | 0 |
| 0 | 0 | 0 | 0 | 0 | 0 | 0 | 0 |

801

802

IMAGE GENERATION DEVICE AND IMAGE GENERATION METHOD

BACKGROUND OF THE INVENTION

1. Technical Field

The present invention relates to three-dimensional computer graphics technology and in particular to hidden surface removal technology for an object in three-dimensional space.

2. Background Art

In order to display an object in three-dimensional space expressed by a computer on a display means, it is necessary to project the object onto a two-dimensional plane (hereafter, "viewscreen") that shows the object. At this time, in the case where plural objects overlap in the visual axis, it is necessary to remove the part of the further object that is hidden by the nearer object before displaying the objects in the display. Such a hidden surface removal method is indispensable in the rendering of three-dimensional computer graphics (hereafter, also called "3DCG").

The Z-buffer method (for example, see Non-Patent Reference 1) can be given as a generally frequently-used hidden surface removal method. FIG. 1A is a diagram for describing the Z-buffer method.

With the Z-buffer method, a buffer (hereafter, "Z-buffer") is provided for storing Z-coordinate values (hereafter, "Z value") of a point where a straight line, which connects a viewpoint V that corresponds to each pixel of a viewscreen 900 with the pixels on the viewscreen 900, intersects with a surface (for example, a polygon indicating an object in three-dimensional space). The Z value increases the further away the viewpoint becomes. In addition, a buffer for storing a pixel value (for example, a color value, a luminance value, and the like) of each pixel (hereafter, "frame buffer") is provided.

FIG. 1A shows a state where two polygons, a polygon 910 and a polygon 920, intersect with one another in three-dimensional space, and these polygons are projected on the viewscreen 900. In this case, the part projected in a pixel 930 of the viewscreen 900 is the part of a point A of the polygon 910, and a point B of the polygon 920 is hidden by the point A of the polygon 910. This is because when the straight line stretching from the viewpoint V to the pixel 930 is extended, a distance ZA between the viewpoint V and the point A is shorter than a distance ZB between the viewpoint V and the point B, and thus, from the viewpoint V, only the point A of the polygon 910, which is closer, is projected on the viewscreen 900.

FIG. 1B is a display example of an image where hidden surface removal using the Z-buffer method has been carried out (in other words, the polygon 910 and the polygon 920 are projected on the viewscreen 900). In FIG. 1B, parts in each polygon with a lower Z value are indicated by a darker black color.

A procedure in the case of carrying out hidden surface removal using the Z-buffer method is as follows.

(1) The Z values in the Z-buffer are initialized to "+∞", and the pixel values in the frame buffer are initialized to "background color", for all pixels in the viewscreen.

(2) All polygons in the three-dimensional space (also called "view volume") that are to be projected are sequentially projected in the viewscreen, and the following processing is performed on all pixels corresponding to each polygon.

(2-1) The Z value is calculated per pixel that corresponds to the polygon to be processed.

(2-2) Only when the Z value calculated in the above (2-1) is lower than the Z value of the corresponding pixel which is stored in the Z-buffer, the pixel value of that pixel is calculated, and the Z value in the Z-buffer and the pixel value in the frame buffer are updated.

Next, the procedure in the case of carrying out hidden surface removal using the Z-buffer method shall be described in further detail, with reference to FIGS. 2A through 2D.

FIG. 2A is an example of an image made up of 8×8 pixels, in which rendering of a polygon 901 has already finished (note that in FIG. 2A, a memory address is indicated by [N-M]). FIG. 2B shows an image in which a new polygon 902 is additionally rendered in FIG. 2A. The Z value corresponding to each pixel is shown in each cell of FIGS. 2A and B. FIG. 2C is an example of pixel values stored in the frame buffer and Z values stored in the Z-buffer, which corresponds to the above FIG. 2A.

As shown in FIG. 2B, when additionally rendering the polygon 902 in the image in which the polygon 901 has been rendered, of the pixels corresponding to the polygon 902, only the pixels with a Z value smaller than the pixels that already correspond to the polygon 901 are employed and rendered in the viewscreen.

The pixel values stored in the frame buffer and the Z values stored in the Z-buffer after the above processing has finished are shown in FIG. 2D. As shown in FIG. 2D, the respective pixel values and Z values are updated only in the case where the Z values of the pixels corresponding to the polygon 902 are smaller than the Z values of the pixels corresponding to the polygon 901.

Through the above procedure, image data, of an image on which hidden surface removal has been carried out and which is an image to be displayed in an actual display that corresponds to the viewscreen, is ultimately stored in the frame buffer.

As described above, the Z-buffer method does require a high-capacity buffer (memory) for storing the pixel values and Z values for all pixels in the viewscreen, but because the algorithm is simple, the method can easily be implemented as hardware, and is used in many devices which carry out rendering in real time.

Non-Patent Reference 1: Araya, Shinji. *Meikai Sanjigen Conpyuta Gurafikkusu* (Three-Dimensional Computer Graphics Explained). 2003: Kyoritsu Publishing.

However, with a conventional image generation device that uses the aforementioned Z-buffer method, reading/writing in the frame buffer and Z-buffer must be carried out continually, for each pixel corresponding to each polygon, and thus an enormous number of memory accesses occur. Therefore, high-speed access is required when accessing the frame buffer and the Z-buffer.

Moreover, in three-dimensional computer graphics, in order to bring rendering processing efficiency to the maximum limit, it is preferable to have the data length of the smallest processing unit for reading/writing (hereafter, "burst length") be the same as the data (including the pixel value and Z value) length of one pixel; it is also necessary to use a memory in which the waiting time during reading/writing (hereafter, "latency") is low.

However, in a system LSI, in which one chip includes a variety of functions, and no particular emphasis is placed on three-dimensional computer graphics processing, there are many cases where a memory suitable for three-dimensional computer graphics processing is not necessarily included (for example, the case where the burst length at the time of a read/write is significantly longer than one pixel's worth of data). In such a system LSI, in the case where the burst length at the time of a read/write is significantly longer than one pixel's worth of data, pixel data of pixels that have no relation to the polygon being rendered is accessed as well, and the processing efficiency drops at the time of a memory access.

Furthermore, in the case of high latency at the time of a memory access, most of the time spent waiting cannot be used for rendering processing, and must be spent waiting idly. Therefore, there is a problem in that the processing efficiency during rendering processing drops, an image that moves smoothly cannot be obtained, and so on, which leads to a decrease in image quality.

Accordingly, an object of the present invention is to solve the aforementioned problem by providing an image generation device which can avoid a drop in processing efficiency during rendering processing even in the case of employing the Z-buffer method in hidden surface removal.

SUMMARY OF THE INVENTION

In the present invention, the following means have been employed to solve the aforementioned problem. In other words, polygon rendering processing is carried out per block made up of a plurality of pixels, and a memory-stored image is created, the memory-stored image being made up of valid pixel data, which is data of the pixels of the polygon rendered in the block. Furthermore, the valid pixel data is stored in a serial address area of a rendering buffer in accordance with the memory-stored image; the memory-stored image is encoded as rendering information data; and the rendering information data is stored in a rendering information buffer. In addition, the minimum required number of memory accesses to the rendering buffer is performed based on the memory-stored image, which is a result of the rendering information data previously referred to being decoded.

To solve the aforementioned problem, an image generation device according to the present invention generates an image by projecting, onto a viewscreen, an object in a virtually-defined space, the object being expressed by a plurality of polygons, and includes: a flag value determination unit which determines, for each pixel on the viewscreen, a value of a valid pixel flag indicating whether or not the pixel is present in a position in the viewscreen in which at least one polygon is projected; a pixel value storage unit which stores, in accordance with the determined pixel value flag, the pixel value of the pixel corresponding to the polygon, in a serial address region of a rendering buffer; and an expanding unit which expands the pixel values stored in the rendering buffer in a frame buffer, in accordance with the value of the determined pixel value flag.

Accordingly, when rendering a polygon using hidden surface removal, valid pixel data necessary for rendering is stored in a serial address region of the rendering buffer in accordance with rendering information data; thus, it is easy to implement memory accesses, and the amount of memory accesses can be significantly reduced.

In addition, the image generation device may further include a dividing unit which divides the viewscreen into a plurality of blocks; the flag value determination unit may determine the value of the valid pixel flag for each of the divided blocks, the pixel value storage unit may store the pixel values in the rendering buffer per block, and the expanding unit may expand the pixel values stored in the rendering buffer in the frame buffer for all of the blocks.

Moreover, the pixel value storage unit may further include: a data length calculation unit which calculates, for the single block, a data length of the pixel value of the block in the rendering buffer, and a data length addition unit which additionally stores the calculated data length in the rendering buffer.

Furthermore, when a single polygon is rendered in the single block, the pixel value storage unit may further generate the pixel value using information which can identify a shape of the polygon and store the generated pixel value in the rendering buffer.

Further still, the pixel value storage unit may include an interpolation calculation unit which interpolates the pixel value using the information which can identify a shape of the polygon, and may store the interpolated pixel value in the rendering buffer.

In addition, a data storage medium according to the present invention is a data storage medium used in an image generation device which generates an image by projecting, onto a viewscreen, an object in a virtually-defined space, the object being expressed by a plurality of polygons. The image generation device includes: a flag value determination unit which determines, for each pixel on the viewscreen, a value of a valid pixel flag indicating whether or not the pixel is present in a position in the viewscreen in which at least one polygon is projected; a pixel value storage unit which stores, in accordance with the determined pixel value flag, the pixel value of the pixel corresponding to the polygon, in a serial address region of a rendering buffer; and an expanding unit which expands the pixel values stored in the rendering buffer in a frame buffer, in accordance with the value of the determined pixel value flag. The data storage medium stores at least one of the determined valid pixel flag and the pixel value in a serial address region.

Note that the present invention may also be implemented as an image generation method, with the characteristic constituent elements of the image generation device realized as steps; or may also be implemented as a program, integrated circuit, and the like which causes a personal computer to execute those steps. It goes without saying that such a program may be widely distributed via a storage medium such as a DVD, a transmission medium such as the Internet, and so on.

The image generation device according to the present invention stores pixels (hereafter, "valid pixels") for a rendered polygon, per block unit made up of a plurality of pixels, in a serial address area of a rendering buffer; therefore, in the rendering of a later polygon, it is possible to access data of valid pixels necessary for rendering only in the serial address area of the rendering buffer, in accordance with rendering information data, which makes it possible to reduce wasteful data at the time of a burst read and significantly reduce the amount of memory accesses.

Therefore, the present invention has an effect in which rendering processing can be performed at high speed, even in a system LSI in which no particular emphasis is placed on three-dimensional graphics processing and which includes a memory with a long burst length at the time of an access.

Moreover, the present invention has another effect in which, by reducing the amount of memory accesses during three-dimensional graphics processing, memory accesses by function modules aside from 3DCG processing that are included in the aforementioned system LSI are not adversely affected.

BRIEF DESCRIPTION OF DRAWINGS

FIG. 2A is an example of an image made up of 8×8 pixels in which a polygon has been rendered.

FIG. 2B is an example of an image in which a new polygon has been additionally rendered in the aforementioned FIG. 2A.

FIG. 2C is an example of pixel values stored in a frame buffer and Z values stored in a Z-buffer, which correspond to the polygon in the aforementioned FIG. 2A.

FIG. 2D is an example of pixel values stored in a frame buffer and Z values stored in a Z-buffer, which correspond to the polygon in the aforementioned FIG. 2B.

FIG. 2E is an example of pixel values stored in a frame buffer and Z values stored in a Z-buffer that have been updated using the Z-buffer method.

FIG. 6A is a diagram showing an example of a table of initialized valid pixel flags.

FIG. 6B is a diagram showing an example of a table of valid pixel flags that corresponds to the above FIG. 5B.

FIG. 6C is a diagram showing an example of a table of valid pixel flags that corresponds to the above FIG. 5C.

FIG. 6D is a diagram showing an example of a table of valid pixel flags that corresponds to the above FIG. 5D.

FIG. 9B is broken up.

Figure 1B:
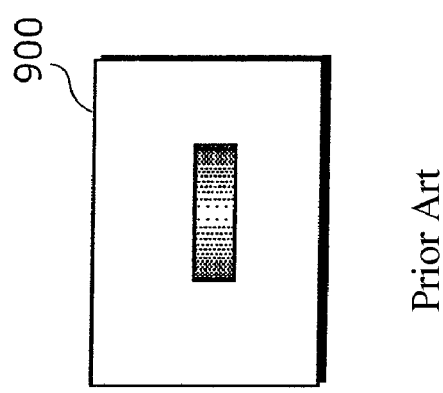
FIG. 1B is an example of an image display in which hidden surface removal has been carried out using the Z-buffer method.
Figure 1A:
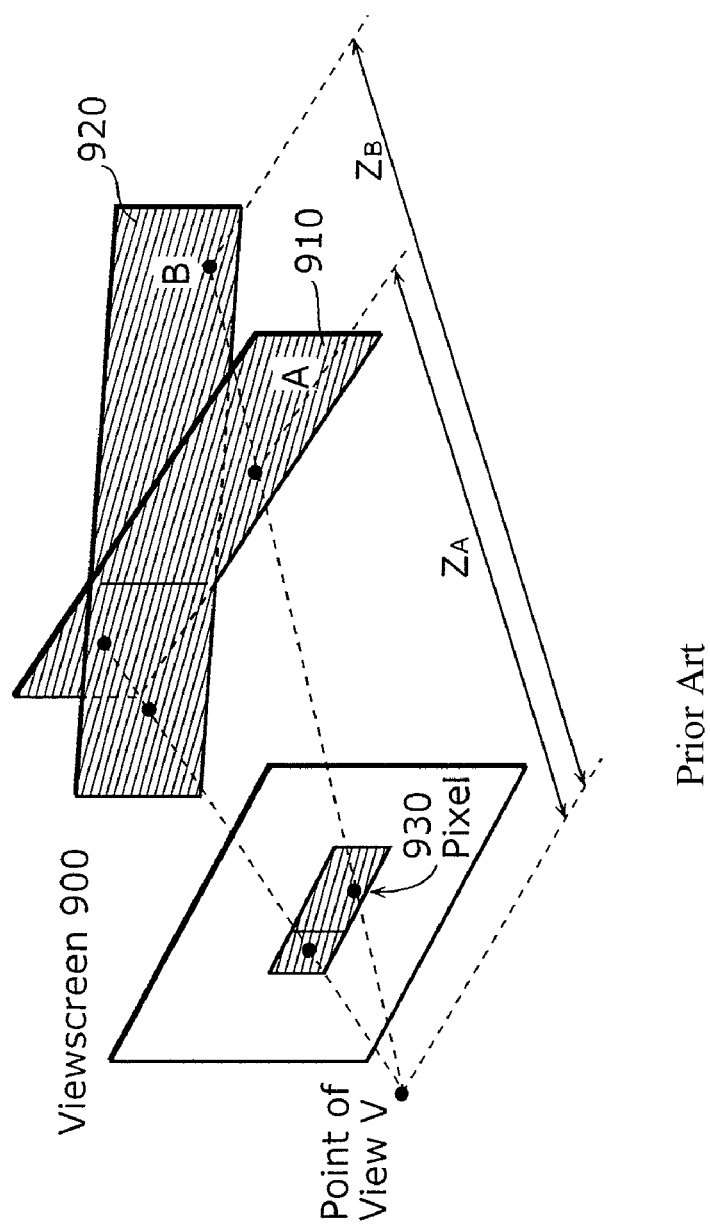
FIG. 1A is a diagram for describing the Z-buffer method.

NUMERICAL REFERENCES 101 render region
102 block
300 image generation device
301 CPU (Central Processing Unit)
302, 1302 graphics engine
303 block buffer
304 memory controller
305 memory
306 rendering buffer
307 rendering information buffer
308 frame buffer
309 display controller
310 display
311 CPU bus
312 memory bus
401 host interface
402 control unit
403 vertex processing unit
404 setup unit
405 rasterizer unit
406 data conversion unit
407 memory bus interface
501 polygon rendered within a block
502 polygon rendered across blocks
601 block in which a polygon is rendered
602 polygon strip additionally rendered in a block
603-605 polygon which makes up a polygon strip
701 condition judgment unit
801 block in which a polygon is rendered
802 polygon additionally rendered in a block
900 viewscreen
901 polygon rendered previously
902 polygon rendered later
910 polygon
920 polygon

DETAILED DESCRIPTION OF THE INVENTION

Hereafter, embodiments of the present invention shall be described with reference to the drawings. Note that in the embodiments described hereafter, the present invention shall be described using the drawings; however, the present invention is not intended to be limited to the content of these drawings.

First Embodiment

Figure 3:
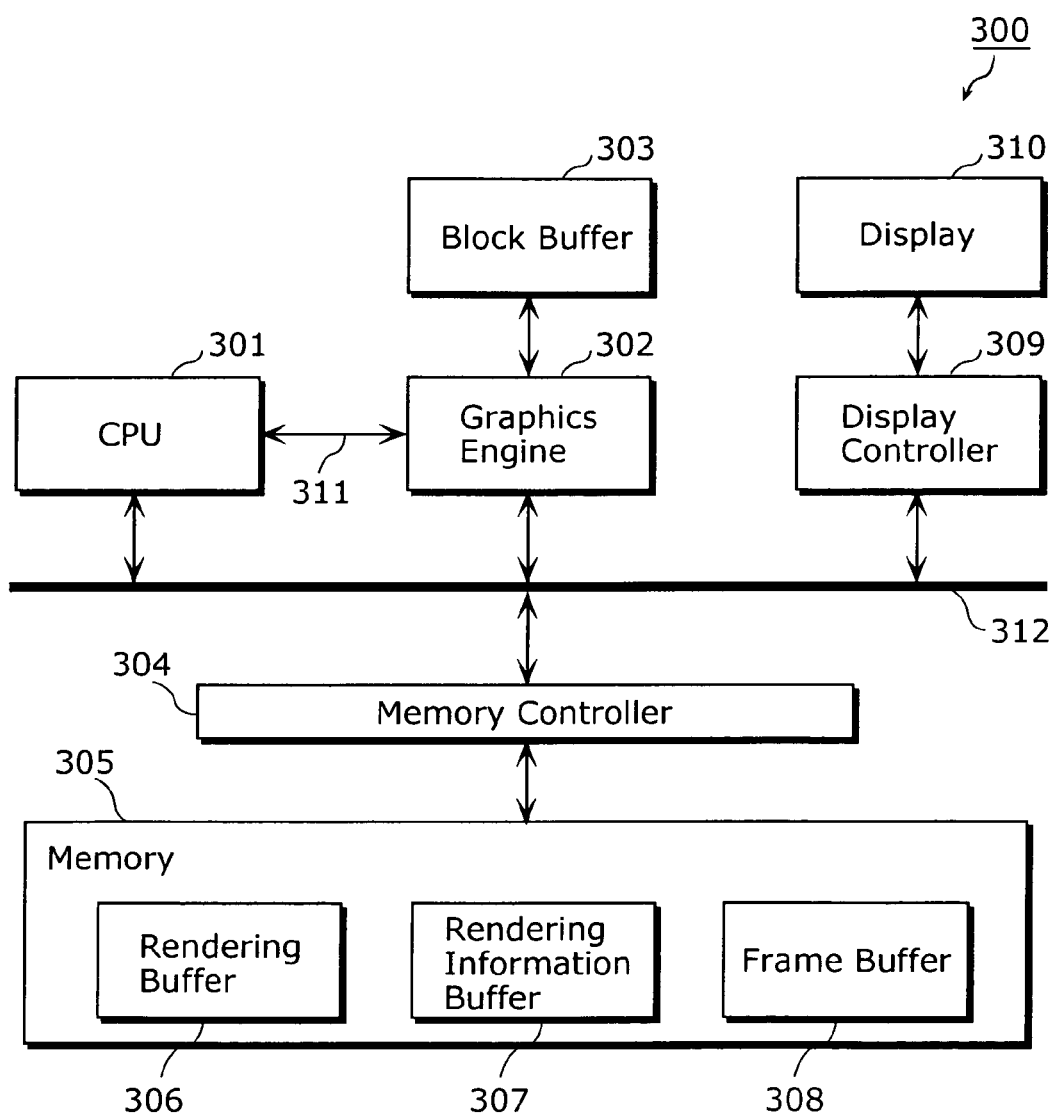
FIG. 3 is a block diagram showing a hardware configuration of the image generation device according to the first embodiment.

FIG. 3 is a block diagram showing a hardware configuration of an image generation device 300 according to the present embodiment. The image generation device 300 shown in FIG. 3 is an image generation device which allows a significant reduction in the amount of memory accesses which accompany hidden surface removal processing in three-dimensional computer graphics, and includes: a CPU 301; a graphics engine 302; a block buffer 303; a memory controller 304; a memory 305; a display controller 309; and a display 310. Furthermore, the memory 305 includes a rendering buffer 306, a rendering information buffer 307, and a frame buffer 308.

The CPU 301 includes a ROM, which stores a control program, and a RAM, and provides rendering instructions to the graphics engine 302 via the CPU bus 311.

The graphics engine 302 performs rendering processing which includes hidden surface removal in accordance with the rendering instructions received from the CPU, and also provides, to the CPU 301 via the CPU bus 311, an interrupt request for the rendering processing. Note that the CPU 301, the display controller 309, and the graphics engine 302 are connected to a memory bus 312 via the memory controller 304, and each access the memory 305 and read/write necessary data.

The block buffer 303 is a working buffer for expanding a rendering image per block into which a render region has been divided, and is directly connected to the graphics engine 302. Here, "rendering image" is uncompressed data that can be directly used in rendering processing (pixel processing) occurring in a rasterizer unit of the graphics engine, and includes pixel values and Z values. Note that it is desirable to use a register or a Static Random Access Memory (SRAM), which reads/writes at high speeds, in the block buffer 303.

It is desirable to use a high-capacity memory, such as a Dynamic Random Access Memory (DRAM), for each buffer in the memory 305. Note that in the present embodiment, these buffers are collected in a single memory, but the buffers may be spread throughout separate memories.

The rendering buffer 306 is a working buffer for when rendering (or in other words, generation of image data) is performed in the graphics engine 302, and stores data necessary for hidden surface removal, including pixel values and Z values.

The rendering information buffer 307 is a working buffer that stores a memory-stored image in the aforementioned rendering buffer for blocks, and stores rendering information data of each block. Note that the rendering information buffer 307 may be partially or completely contained within the rendering buffer 306. In addition, the rendering information buffer 307 may be configured of a high-speed readable/writable register or SRAM, in the same manner as the block buffer 303.

The frame buffer 308 is a buffer that stores image data of the image that is ultimately to be displayed in the display 310, and stores image data generated by the graphics engine 302. Note that the image data stored in the frame buffer 308 is read out by the display controller 309 and outputted to the display 310.

Figure 4:
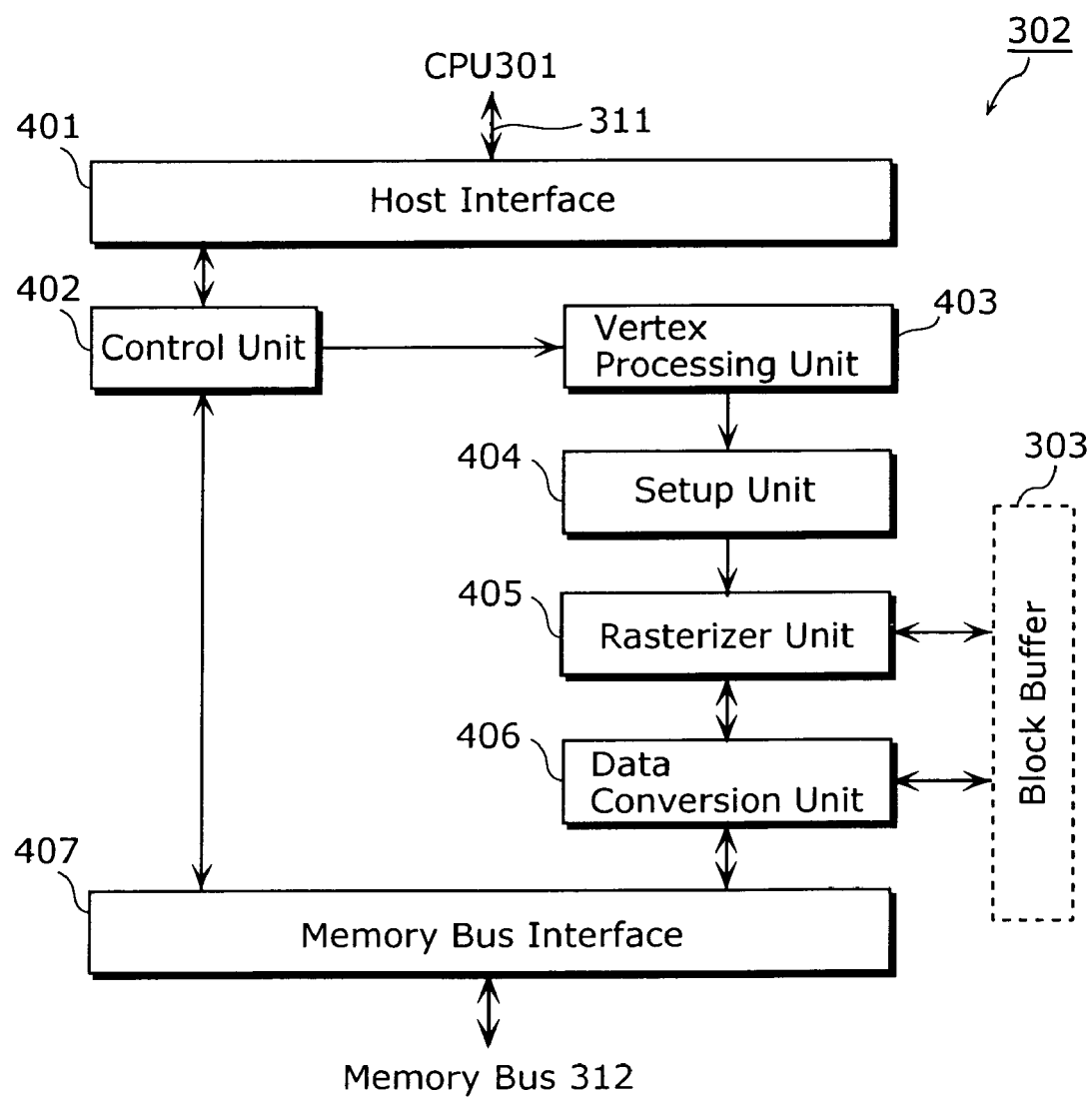
FIG. 4 is a block diagram showing a functional configuration of a graphics engine according to the first embodiment.

FIG. 4 is a block diagram showing a functional configuration of the graphics engine 302 shown in the aforementioned FIG. 3. As shown in FIG. 4, the graphics engine 302 includes: a host interface 401; a control unit 402; a vertex processing unit 403; a setup unit 404; a rasterizer unit 405; a data conversion unit 406; and a memory bus interface 407.

The host interface 401 accepts a rendering control signal, such as a rendering instruction and the like, from the CPU 301 via the CPU bus 311, or outputs a graphics core interrupt signal and the like to the CPU 301.

The control unit 402 outputs, to the vertex processing unit 403, polygon data that accompanies the rendering instruction accepted from the CPU 301.

The vertex processing unit 403 uses the polygon data inputted from the control unit 402 to perform light source calculation, coordinate conversion processing, and the like on the vertices of each polygon (three vertices, in the case of a triangular polygon), and outputs the resultant to the setup unit 404.

The setup unit 404 calculates, from the coordinates of the vertices of each polygon and coefficients such as the pixel values and Z values of each pixel corresponding to these vertices, the slope of straight lines surrounding the polygon and an interpolated value of the coefficients such as the pixel values and Z values of other pixels corresponding to the polygon, and outputs the resultant to the rasterizer unit 405. Note that various methods of interpolation, such as linear interpolation, interpolation using a spline function equation, and the like can be considered for the method of interpolation calculation at this time; however, this is not intended to limit the present invention to one specific method.

The rasterizer unit 405 uses the coefficients inputted by the setup unit 404 and an interpolated value of the coefficients calculated by the setup unit 404 (hereafter, "setup coefficients") and performs rendering processing of the polygon.

The data conversion unit 406 decodes and encodes the data stored in the rendering buffer 306 and the rendering information buffer 307, which are present in the memory 305.

Next, a processing flow when the rasterizer unit 405 of the present embodiment renders a polygon shall be described.

First, the rasterizer unit 405 scans internal coordinates of the polygon per block, and determines the blocks in which to render the polygon.

Next, the data conversion unit 406 accesses the rendering information buffer 307 via the memory bus interface 307, and reads out the rendering information data of the determined blocks. Furthermore, the data conversion unit 406 performs a minimum required number of read accesses to the rendering buffer 306 via the memory bus interface 407, in accordance with details of valid pixel flags in the rendering information data. Further still, the data conversion unit 406 expands the read-out valid pixel data in the block buffer 303 and reconstitutes the rendering image.

After that, the rasterizer unit calculates the pixels values and Z values for the pixels within the polygon, and blends the resultant with the rendering image expanded in the block buffer 303. Here, "blending" is a generic term for processing which blends a rendered, processed polygon with a polygon currently undergoing processing, such as hidden surface removal processing using Z values and semitransparent processing using an alpha component (blending ratio) included in the pixel values.

Finally, the data conversion unit 406 fetches the valid pixel data from the rendering image in the block buffer 303, stores the data in a serial address region of the rendering buffer 306, updates the valid pixel flags, and stores the rendering information data in the rendering information buffer 307.

After rendering of all polygons has finished, the data conversion unit 406 converts the content of the rendering buffer 306 to a format displayable in the display 310, and stores the resultant in the frame buffer 308. Note that it is possible for the CPU 301 to perform the processes of the vertex processing unit 403 and the setup unit 404; however, in such a case, the setup data is outputted from the control unit 402 directly to the rasterizer unit 405.

FIG. 5 is a diagram showing an outline of a polygon rendering method in the present embodiment.

Figures 5A, 5B, 5C, 5D:
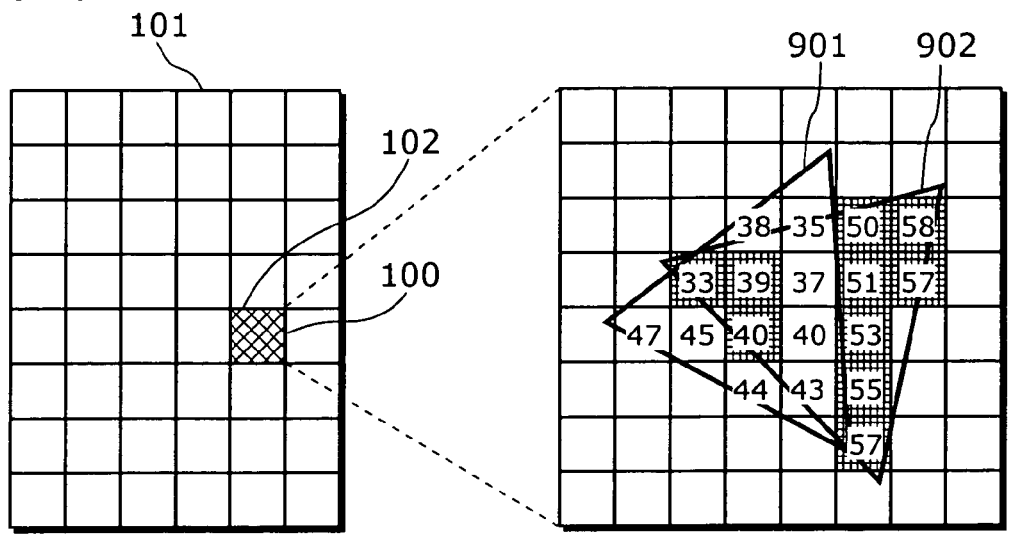
FIG. 5A is a diagram showing a rendering image of a polygon in a rendering buffer according to the first embodiment.
FIG. 5B is a diagram showing an example of color values and Z values when rendering a polygon.
FIG. 5C is a diagram showing an example of color values and Z values when rendering an other polygon.
FIG. 5D is a diagram showing an example of color values and Z values when synthesizing the polygon in the above FIG. 5B with the polygon in the above FIG. 5C and rendering the resultant.

FIG. 5A is a rendering image of a polygon in the rendering buffer 306. FIG. 5A shows a polygon 103 rendered in a block 102, the block 102 being made up of a plurality of pixels (8×8 pixels in the present embodiment, although the block may be made up of other amounts of pixels) and generated by dividing the viewscreen into rendering regions 101 (48 divisions, in the present embodiment).

The pixel values within the polygon in FIG. 5A indicate color values. When a polygon 901 is rendered in the block 102, the pixels within the polygon 901 are rendered. In the present invention, pixels applicable when rendering the polygon are called "valid pixels." Only data of the valid pixels (including pixel values and Z values) from the block 102, of the post-rendering polygon 901, is stored in the rendering buffer 306. At this time, each unit of valid pixel data is stored in a serial address region of the rendering buffer 306, as shown in FIG. 5B. The rendering information data of the block 102 is flags indicating whether or not the polygon has been rendered in each pixel of the block (hereafter, "valid pixel flags"), and is stored in table format, as shown in FIG. 6A. At first, the values of the valid pixel flags are initialized to a value of "0", indicating that the polygon has not been rendered; however, as the polygon is rendered, the flags corresponding to the pixels that indicate the rendering are set at a value of "1", are updated as shown in FIG. 6B, and are stored in the rendering information buffer 307.

When rendering another polygon in the block 102, it is possible to refer to valid pixel data by decoding the memory-stored image of FIG. 5B, referring to the table in FIG. 6B.

Hereafter, a detailed procedure of the hidden surface removal carried out when rendering a polygon in the present embodiment shall be described. First, the rendering information data of the blocks in which to render the polygon are read out. It is possible to judge, from the value of the valid pixel flag in the rendering information data, a position of the valid pixel data stored in the rendering buffer 306. For example, when reconstituting a rendering image in the block 102 shown in FIG. 5A from the data stored in the rendering buffer 306 as shown in FIG. 5B, the image can be reconstituted by assigning the valid pixel data read out from the rendering buffer 306, in address order, to the pixels with a valid pixel flag value set at "1", shown in FIG. 6B, and assigning the initial values of the pixel values and Z values to pixels that correspond to valid pixel flags set at a value of "0". In addition, the number of pixels in which the valid pixel flag is set at a value of "1" shows the number of valid pixels; therefore, in reading out the valid pixel data, it is possible to perform memory accesses only of an amount "(number of valid pixels)×(data amount of 1 pixel)", from the starting address of the corresponding block in the rendering buffer 306.

In the above example, from "memory address 0" to "memory address 10" in the rendering buffer 306 is the region in which the valid pixel data is stored (hereafter, "valid pixel data region"), and it is possible to read out all of the valid pixel data by carrying out read accesses on this region only.

Through the above procedure, pixels corresponding to the read-out valid pixel data and the valid pixel data region are determined, the valid pixel data is read out from the valid pixel data region of the rendering buffer, and the rendering image is reconstituted per block.

Next, hidden surface removal processing is performed in the blocks using the polygon to be newly rendered and the pixel values and Z values of the reconstituted rendering image in the blocks. Among new rendering images in blocks created in this manner, data of valid pixels is again stored in order from the starting address of the corresponding block in the rendering buffer 306; furthermore, the valid flags of the rendering information data are updated to a value of "1", for flags of pixels that have newly become valid pixels, and are stored in the rendering information buffer 307.

This is performed repeatedly for all blocks and all inputted polygons.

To ultimately generate an image of an object made up of a plurality of polygons in the display 310 in accordance with the above procedure, the valid pixel data of the block stored in the rendering buffer 306 is read out, in the same manner as during rendering of the block described earlier, and the rendering image in the block is expanded in the address region corresponding to the position of the block in the frame buffer 308.

Figure 7:
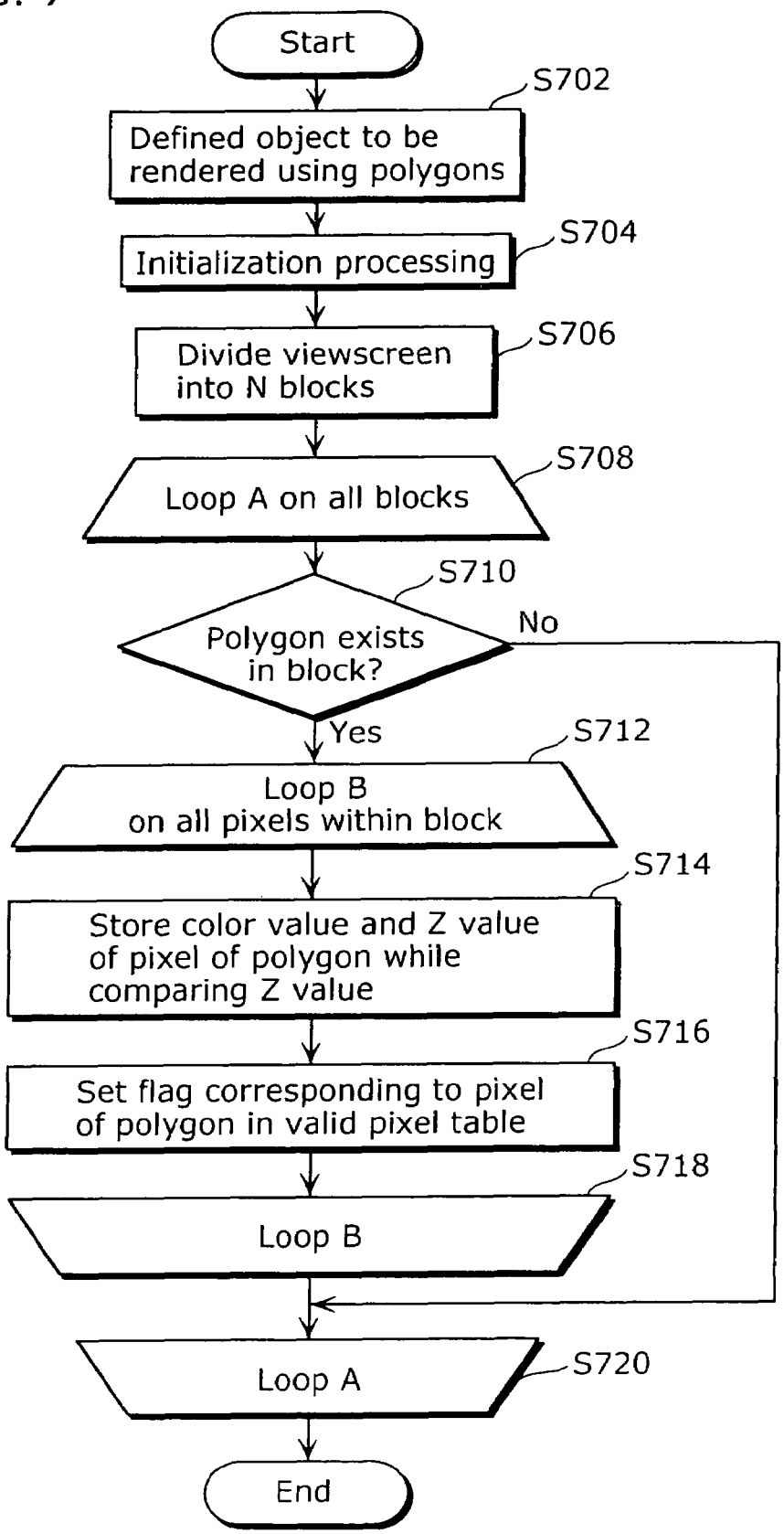
FIG. 7 is a flowchart showing a processing flow of the image generation device according to the first embodiment.

Hereafter, an operation of the image generation device 300 configured as above shall be described. FIG. 7 is a flowchart showing a processing flow of the image generation device 300.

First, the control unit 402 acquires, via the host interface 401, polygon data of the object to be rendered (S702), and stores this in the rendering buffer 306. Furthermore, the control unit 402 performs initialization processing on each buffer in the memory 305 (S704). Next, the control unit 402 divides the viewscreen into N (48, in the present embodiment) blocks made up of 8×8 pixels (S706).

After this, the control unit 402 controls each unit to perform the following processing for all blocks (S708-S720).

First, the rasterizer unit 405 judges whether or not a polygon is present in the block (S710), and in the case where a polygon is present (YES of S710), performs the following processing on all of the pixels in the blocks (S712-S718).

The rasterizer unit 405 compares the Z values of the pixels corresponding to each polygon, and updates the pixel values (for example, color values) and Z values of the pixels that make up the polygon to the lower Z values (S714). Furthermore, the rasterizer unit 405 sets valid pixel flags corresponding to the pixels projected by this polygon (S716).

Figure 8:
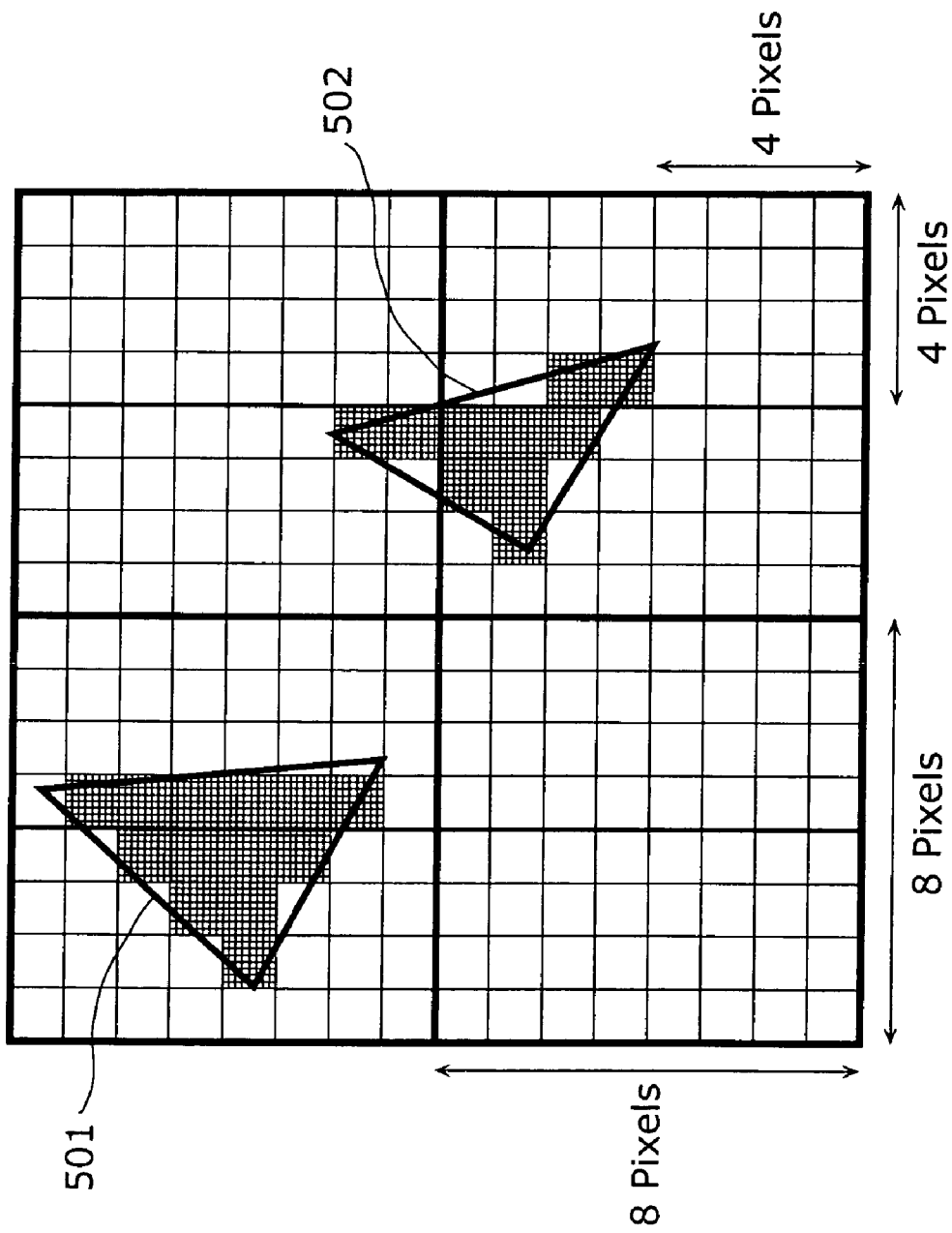
FIG. 8 is a diagram for describing an effect of the first embodiment.

Next, an effect of the image generation device 300 according to the present embodiment shall be described using FIG. 8. Here, the memory readout burst length is a data length of 4×4 pixels, and the block is made up of 8×8 pixels. In a conventional image generation device, rendering is performed in 4×4 pixel units, in accordance with the burst length; with the image generation device 300 in the present embodiment, rendering is performed in 8×8 pixel units. At this time, in the case of reading out, from the memory, the data of the pixels that constitute the polygon 501, the conventional image generation device must perform four memory accesses; however, the image generation device 300 in the present embodiment has collected and stored the valid pixel data in the serial address region of the rendering buffer 306, and thus only needs to perform one memory access. In addition, even when reading out, from the memory, a polygon 502 which is rendered across blocks, the conventional image generation device must perform 3 memory accesses, while the image generation device 300 of the present embodiment must perform 2, and therefore it is possible to reduce the number of memory accesses. Note that the position information of the valid pixels is managed by the rendering information buffer 307; thus, it is also possible to compress the data stored in the rendering buffer 308 through a generally-known method such as the run-length method, the Huffman method, and so on, in order to increase the memory access efficiency.

In the present embodiment, the pixel values and Z values are given as examples of the valid pixel data stored in the rendering buffer 308; however, in the case of performing hidden surface removal through a method that does not use Z values, the Z values may of course be omitted.

Second Embodiment

FIGS. 9A to 9F are diagrams showing an outline of a polygon rendering method according to a second embodiment of the present invention.

Figure 9A:
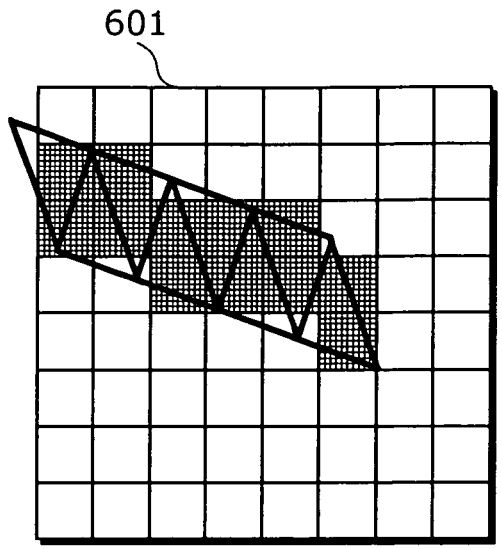
FIG. 9A is a diagram showing a rendering image of a polygon in a rendering buffer according to the second embodiment.
Figure 9B:
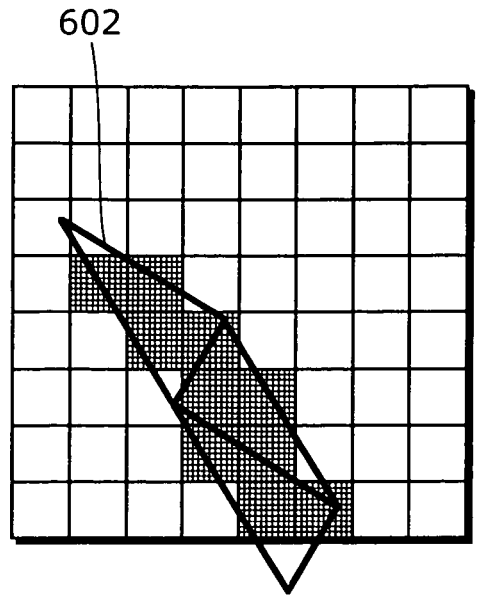
FIG. 9B is a diagram showing a rendering image of an other polygon in a rendering buffer according to the second embodiment.
Figure 9C:
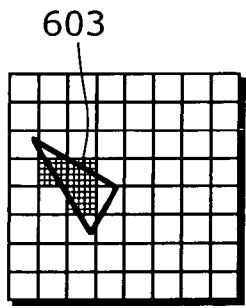
FIGS. 9C to 9E are diagrams showing a state in which the polygon in the above
Figure 9D:
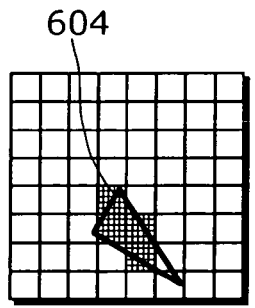
Figure 9E:
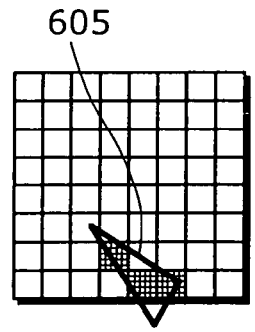
Figure 9F:
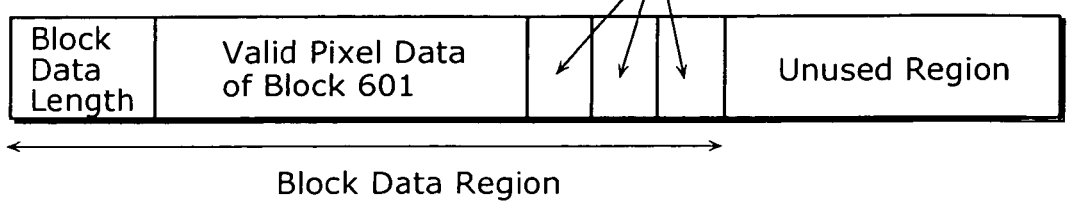
FIG. 9F is a diagram showing an example of data stored in a rendering buffer in the second embodiment.

FIG. 9A is a diagram showing a rendering image in a block in which a polygon has already been rendered. FIG. 9B is a diagram showing a rendering image of a polygon strip to be additionally rendered in a block 601 shown in the above FIG. 9A. In the first embodiment, each time a new polygon is to be rendered, the rendering buffer 306 is accessed, valid pixel data is read/written in block units, and the rendering image is updated; in the present embodiment, a method is employed in which a rendering image of a polygon to be newly rendered is created and rendering data is additionally written at an end of a data region of the corresponding block in the rendering buffer 306, without first performing a readout access to the rendering buffer 306. In order to manage the rendering data of the polygon which is additionally written, a data length of the corresponding block in the rendering buffer 306 (hereafter, "block data length") is included in the rendering information data in addition to the valid pixel flag used in the above first embodiment. For example, in the case of rendering a polygon strip 602 shown in FIG. 9B in a block 601 shown in FIG. 9A, pixel values and Z values within each of polygons 603, 604, and 605, which make up the polygon strip 602, are calculated, a rendering image is created, and the rendering data is additionally written to the rear address of the memory region of the rendering buffer 306, in which the valid pixel data of the block 601 is stored. The data of the block 601 in the rendering buffer 306 is stored after the valid pixel data of the block 601, as shown in FIG. 9F. At this time, the block data length is updated to a size that includes the additionally written rendering data. When the block data length has reached a certain size, the data region of the corresponding block in the rendering buffer 308, in which the valid pixel data and rendering data of the polygon is stored, is accessed for readout, and a single rendering image is synthesized.

Hereafter, a procedure of rendering in the block in the present embodiment shall be described in detail. First, the rendering information data of the block in which the polygon is to be rendered is read out. Here, it is judged whether or not the block data length of the rendering information data of the block has reached a specified size. Here, the judgment is "true" in the case where the block data length of the block has reached the specified size, and "false" in the case where the block data length has not reached the specified size.

In the case of a "false" judgment, a rendering image of only the polygon to be rendered in the block is created; the rendering data is additionally written into the rear address of the rendering data region of the block in the rendering buffer 306; the block data length of the rendering information data is increased to the size of the rendering data; and the resultant is stored in the rendering information buffer 307. Here, the additionally written rendering data of the polygon is created from the valid pixel data, in the same manner as the rendering image of the block; the valid pixel flags of the polygon are stored in the rendering buffer 306 along with the valid pixel data. In the case of a "true" judgment, or in the case of outputting a final image, first, the rendering buffer 306 is accessed of an amount equivalent to the block data length of the rendering information data. When data readout from the rendering buffer commences, first, a rendering image of the block is reconstituted from the valid pixel flags of the rendering information data, in the same procedure as in the first embodiment.

After this, a rendering image of the polygon not yet synthesized is reconstituted from the valid pixel flags and the valid pixel data of the polygon read out from the rendering buffer 306, which is sequentially blended with the rendering image in the block.

Finally, the inputted polygon is blended with the rendering image in the block. The valid pixel data of the updated rendering image is once again stored in the serial address region of the rendering buffer 306; the valid pixel data of the block is set in accordance with the updated rendering image; the block data length is set to the size of the valid pixel data of the block, and the resultant is stored in the rendering information buffer. After repeating this for all blocks and all inputted polygons, it is possible to display the image in the display 910 by outputting the data to the frame buffer 308, through the same procedure as in the first embodiment.

Figure 10:
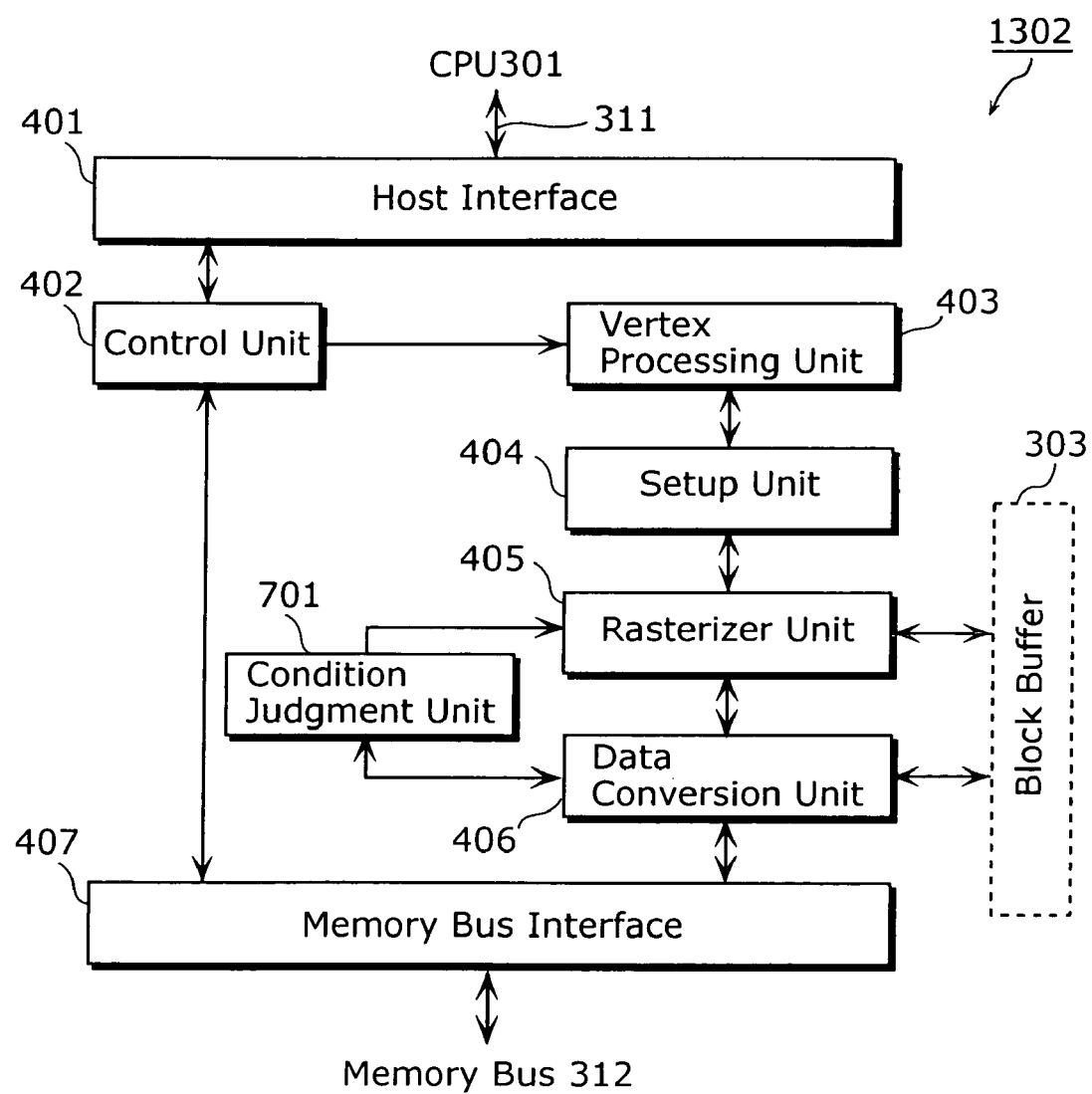
FIG. 10 is a block diagram showing a functional configuration of a graphics engine according to the second embodiment.

Although the image generation device that renders polygons through the above procedure has almost the same configuration as the image generation device of the first embodiment, a graphics engine 1302 is configured as shown in FIG. 10. The graphics engine 1302 differs from that of the first embodiment in that a condition judgment unit 701 has been added. The condition judgment unit 701 receives a block data length from among the rendering information data decoded by the data conversion unit 406, and judges which of the following to perform:

(1) additionally writing, in the rendering buffer 306, the rendering data of only the polygon inputted to the rasterizer unit 405, without accessing the rendering buffer 306 to perform a readout, or (2) accessing the rendering buffer 306 to perform a readout, and blending the rendering image in the block with the rendering images of polygons additionally drawn thus far and the polygons inputted into the rasterizer unit 405.

The rasterizer unit 405 and the data conversion unit 406 perform the processing (1) or the processing (2) mentioned above in accordance with the judgment made by the condition judgment unit 701.

In the rendering processing in the present embodiment, the rasterizer unit 405 scans internal coordinates of polygons per block and determines the blocks in which to render the polygon, in the same manner as in the first embodiment. Next, the data conversion unit 406 accesses the rendering information buffer 307, reads out and decodes the rendering information data of the block, and outputs the block data length from the rendering information data to the condition judgment unit 701.

The condition judgment unit 701 performs the above judgment on the block data length, and determines whether to perform the above processing (1) or processing (2). In the case of the processing (1), first, the rasterizer unit 405 creates, in the block buffer 303, a rendering image of the inputted polygon. Next, the data conversion unit 406 creates the valid pixel flags and valid pixel data from the rendering image of the polygon in the block buffer 303, and additionally writes the data of that block into the rendering buffer 306, in the same manner as in the first embodiment. In the case of the processing (2), the data conversion unit 406 issues a request for a readout access to the address in which the data of the corresponding block is stored in the rendering buffer 306, in the amount of the block data length.

When the data readout is commenced, the data conversion unit 406 reconstitutes, in the block buffer 303, a rendering image in the block, from the valid pixel flags of the rendering information data, and reconstitutes the remaining read-out data into a rendering image of the polygon, in order from the valid pixel flags and the valid pixel data, and outputs the rendering image to the rasterizer unit 405. The rasterizer unit 405 blends the rendering image of the polygon inputted from the data conversion unit 405 and the polygon inputted from the setup unit 404 with the rendering image in the block in the block buffer 303.

Finally, the data conversion unit 406 fetches the valid pixel data from the rendering image in the block buffer 303 and stores the data in the serial address region of the rendering buffer 306, updates the valid pixel flags of the rendering information data, sets the block data length to the size of the valid pixel data, and stores the resultant in the rendering information buffer 307. After all polygons have been rendered, the processing (2) is performed on all the blocks, and results are stored in the frame buffer 308.

Next, an effect of the image generation device according to the present embodiment shall be described. With the image generation device 300 in the first embodiment, it is possible to reduce the number of memory accesses by devising a method for storing pixels that constitute a polygon in the rendering buffer 306. However, because readout accesses to the memory are performed each time a polygon is rendered, the problem of memory readout latency remains. In response to this problem, the image generation device in the present embodiment first writes the polygon rendering data into the rendering buffer 306. In regards to writing into the memory, with a general memory bus, there is no need to wait for the writing into the memory to actually finish, and therefore only the amount of time required for issuing a write request is required for performing a memory access. In addition, when synthesizing the rendering image in the block with the rendering image of the polygon, memory readout requests for the valid pixels of a block and the additionally written polygon rendering data can be performed successively all at once, and thus it is possible to reduce waiting time caused by memory readout latency. In the image generation device of the present embodiment, in the case where the memory readout latency is sufficiently longer than the time for issuing a write request, a readout request, and so on, the memory readout latency when processing N polygons at once becomes 1/N that of the image generation device of the first embodiment. As a result, the time required for memory accesses is reduced, and the rendering speed increases significantly.

Note that the creation of the rendering data of the polygon, which is additionally written to the block data in the rendering buffer 306, is not limited to using the compression method shown in the present embodiment; it is also possible to use a generally known reversible compression method, such as the run-length method or the Huffman method, and irreversible compression method using a discrete cosine transform (DCT) for pixel values, and so on. Because the locality of the rendering data for one polygon is high, a compression rate higher than that of a normal rendering image in which a plurality of polygons has been rendered can be achieved.

Third Embodiment

Figure 11A:
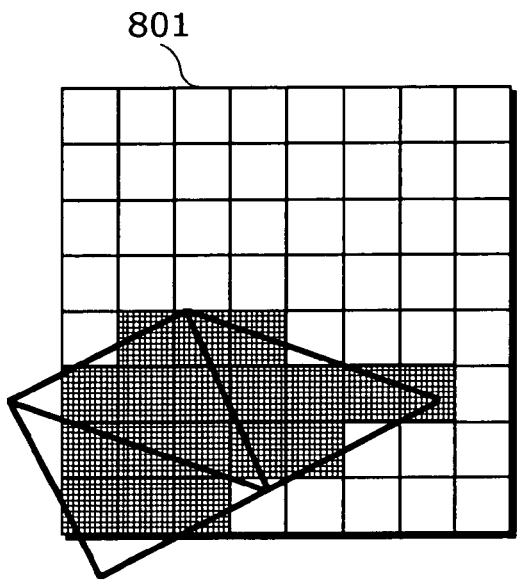
FIG. 11A is a diagram showing a rendering image of a polygon in a rendering buffer according to the third embodiment.
Figure 11B:
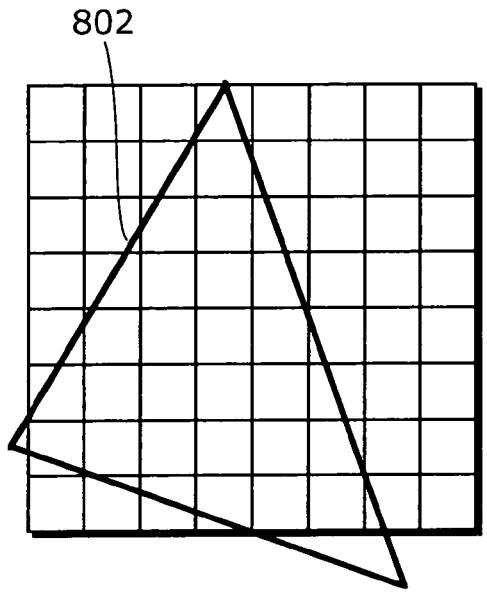
FIG. 11B is a diagram showing an example of an image of a polygon to be additionally rendered, in the third embodiment.
Figure 11C:
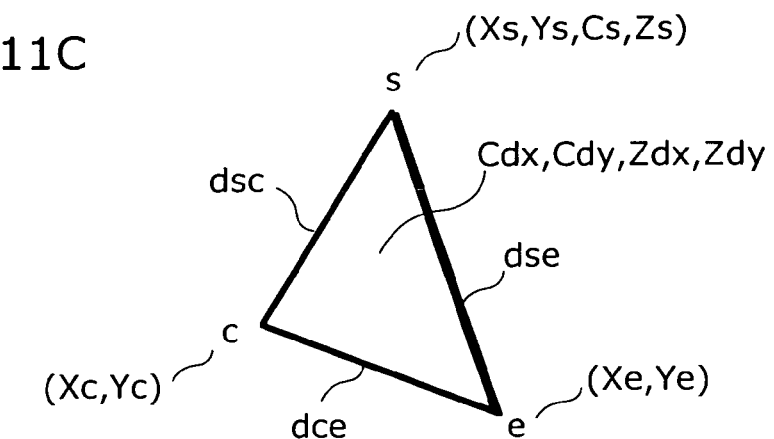
FIG. 11C is a diagram showing an example of setup coefficients in the third embodiment.
Figure 11D:
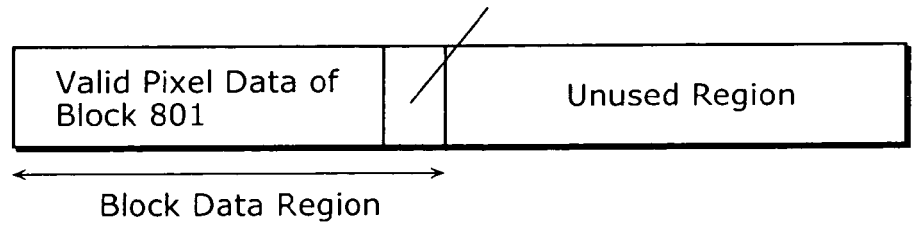
FIG. 11D is a diagram showing an example of data stored in a rendering buffer in the third embodiment.

FIGS. 11A to 11D are diagrams showing an outline of a polygon rendering method according to the present embodiment. FIG. 11A shows a rendering image in a block in which plural polygons have already been rendered. In addition, FIG. 11B shows a polygon 802 to be additionally rendered in a block 801 shown in FIG. 11A. In the case of rendering the polygon 802 of FIG. 11B in the block 801 of FIG. 11A, in the second embodiment, a rendering image of the polygon is additionally written into the rendering buffer 306; however, in the present embodiment, setup coefficients of the polygon 802, as shown in FIG. 11C (here, the setup coefficients are made up of XY coordinates, a pixel value, and a Z value of a vertex S, XY coordinates of vertices c and e, slopes of sides sc, se, and ce, and XY direction differences between the pixel value and Z value), are additionally written into the rendering buffer 306. In the case where the setup coefficients have been additionally written, the data of the block in the rendering buffer 306 becomes as shown in FIG. 11D.

A procedure for rendering a polygon in the present embodiment is almost identical to that of the second embodiment; the procedure differs in that in the case where the block data length has not reached a specified size, the data additionally written into the rendering buffer 306 is the setup coefficients of the polygon rather than the rendering image of the polygon. In the case where the block data length has reached the specified size, the rendering image in the block is reconstituted; at this time, the pixel values and Z values within each polygon are calculated for the first time; and blending with the rendering image in the block is carried out.

An image generation device that performs rendering of a polygon through the above procedure is basically configured in the same manner as the image generation device shown in the second embodiment; however, an operation at the time of rendering a polygon in each block differs slightly.

In the case where the condition judgment unit 701 has judged to additionally write the polygon data, the rasterizer unit 405 outputs, to the data conversion unit 406, the setup coefficients inputted from the setup unit 404; the data conversion unit 406 stores the setup coefficients in the rendering buffer 306, adds the block data length of the rendering information data in the amount of the data length of the setup coefficients, and stores the resultant in the rendering information buffer. In the case where the condition judgment unit 701 has determined to synthesize the polygon data with the rendering image in the block, the data conversion unit 406 reconstitutes the rendering image in the block in the block buffer 303 from the valid pixel data in the rendering buffer 306, in the same manner as in the second embodiment. The remaining readout data is outputted to the rasterizer unit 405 as setup coefficients. The rasterizer unit 405 calculates, from the setup coefficients inputted from the data conversion unit 406 and the setup unit 404, the pixel values and Z values within the respective polygons and blends the resultant with the rendering image in the block buffer 303.

In describing an effect of the image generation device according to the present embodiment, performing anti-aliasing using the present image generation device can be considered. "Anti-aliasing" is a processing for reducing coarse patterns appearing on the borders of a polygon (aliasing) and improving image quality when the polygon is displayed in a display.

A method in which rendering is first performed at a higher resolution than the resolution of the display, and when writing to the frame buffer 308, the pixel values of plural pixels in the rendering buffer 306 are averaged, and the pixel value of a corresponding single pixel in the frame buffer is found, is well-known as a general anti-aliasing method.

However, in the case where anti-aliasing is performed at a resolution N times that of the frame buffer, the data volume written into the rendering buffer increases N times. Therefore, with an image generation device that updates the rendering buffer 306 each time a polygon is rendered, N times the number of memory access must be performed each time, resulting in significant time required for rendering processing. In addition, in the image generation device in the second embodiment, the data amount of both the valid pixel data in the block and the rendering data of the polygon becomes N times the amount, the block data length easily reaches the specified size, and synthesis of the rendering image in the block is performed frequently; thus the number of memory accesses increases, resulting in significant time required for rendering processing.

On the other hand, with the image generation device in the present embodiment, setup coefficients of the polygon which do not depend on the processing resolution are first stored in the rendering buffer 306, and thus an increase in the block data length can be suppressed, the interval in which the rendering image in the block is synthesized with the plural polygons can be increased, and furthermore, during synthesis, N times the valid pixel data and the setup coefficients that do not depend on the resolution may be read/written in the rendering buffer 306; therefore, the number of memory accesses is reduced, and the rendering speed is significantly increased. It goes without saying that the image generation device according to the present embodiment is very advantageous even when simply generating high-resolution frames, for the same reason as with the abovementioned anti-aliasing processing.

Note that the setup coefficients used in the description of the present embodiment are only one example, and other setup coefficients, such as texture, fog, and so on, may be included; or, the setup coefficients used in the present embodiment may not be omitted if they will not be used in rendering. In addition, the setup coefficients stored in the rendering buffer 306 may be compressed using a generally-known compression method, such as the run-length method or the Huffman method.

Moreover, in the first-third embodiments, the pixel values and Z values are described as being stored in a memory such as the rendering buffer; however, these values may be stored in a magnetic storage medium such as a hard disk, an optical disk storage medium such as a DVD or a CD, or another type of storage medium, not limited to a memory.

The image generation device of the present invention can be used in various electronic devices that have a graphics rendering function, such as, for example, cellular phones, PDAs, digital televisions, car navigation systems, household video game machines, personal computers, and so on.

The invention claimed is:

1. An image generation device that generates an image by projecting, onto a viewscreen, an object in a virtually-defined space, the object being expressed by a plurality of polygons, said image generation device comprising:
    a flag value determination unit operable to determine, for each of a plurality of pixels on the viewscreen, a value of a valid pixel flag indicating whether or not a pixel is a valid pixel included in at least one polygon projected on the viewscreen;
    a pixel value storage unit operable to store, in a serial address region of a rendering buffer, only a pixel value of each of the plurality of pixels indicated as valid pixels, out of all the plurality of pixels on the viewscreen regardless of the position of the valid pixel; and
    an expanding unit operable to expand, in a frame buffer, the pixel value of the valid pixel stored in the rendering buffer, in accordance with the value of the determined valid pixel flag,
    wherein said pixel value storage unit is operable to successively store a plurality of pixel values including the pixel value of each of the valid pixels so as to avoid storing a pixel value of a pixel, other than the pixel values of valid pixels, between the plurality of the pixel values of the valid pixels.

2. The image generation device according to claim 1, further comprising
    a dividing unit operable to divide the viewscreen into a plurality of blocks,
    wherein said flag value determination unit is operable to determine the value of the valid pixel flag for each of the divided blocks;
    said pixel value storage unit is operable to store the pixel values in the rendering buffer per block; and
    said expanding unit is operable to expand the pixel values stored in the rendering buffer in the frame buffer for all of the blocks.

3. The image generation device according to claim 2, wherein said pixel value storage unit further includes:
    a data length calculation unit operable to calculate, for the single block, a data length of the pixel value of the block in the rendering buffer, and
    a data length addition unit operable to additionally store the calculated data length in the rendering buffer.

4. The image generation device according to claim 1, wherein when a single polygon is rendered in the single block, said pixel value storage unit is further operable to generate the pixel value using information which can identify a shape of the polygon and store the generated pixel value in the rendering buffer.

5. The image generation device according to claim 4, wherein said pixel value storage unit includes an interpolation calculation unit operable to interpolate the pixel value using the information which can identify a shape of the polygon, and
    is operable to store the interpolated pixel value in the rendering buffer.

6. An integrated circuit which implements the units included in the image generation device according to claim 1.

7. An image generation method for generating an image by projecting, onto a viewscreen, an object in a virtually-defined space, the object being expressed by a plurality of polygons, said image generation method comprising:
    a flag value determination step of determining, for each of a plurality of pixels on the viewscreen, a value of a valid pixel flag indicating whether or not a pixel is a valid pixel included in at least one polygon projected on the viewscreen;
    a pixel value storage step of storing, in a serial address region of a rendering buffer, only a pixel value of each of the plurality of pixels indicated as valid pixels, out of all the plurality of pixels on the viewscreen regardless of the position of the valid pixel; and
    an expanding step of expanding, in a frame buffer, the pixel value of the valid pixel stored in the rendering buffer, in accordance with the value of the determined valid pixel flag,
    wherein said pixel value storage step involves successively storing a plurality of pixel values including the pixel value of each of the valid pixels so as to avoid storing a pixel value of a pixel, other than the pixel values of the valid pixels, between the plurality of the pixel values of the valid pixels.

8. A program stored in a storage medium for use in an image generation device which generates an image by projecting, onto a viewscreen, an object in a virtually-defined space, the object being expressed by a plurality of polygons, said program causing a computer to execute:
    a flag value determination step of determining, for each of a plurality of pixels on the viewscreen, a value of a valid pixel flag indicating whether or not the pixel is a valid pixel included in at least one polygon projected on the view screen;
    a pixel value storage step of storing, in a serial address region of a rendering buffer, only a pixel value of each of the plurality of pixels indicated as valid pixels, out of all the plurality of pixels on the viewscreen regardless of the position of the valid pixel; and
    an expanding step of expanding, in a frame buffer, the pixel value of the valid pixel stored in the rendering buffer, in accordance with the value of the determined valid pixel flag,
    wherein said pixel value storage step involves successively storing a plurality of pixel values including the pixel value of each of the valid pixels so as to avoid storing a pixel value of a pixel, other than the pixel values of the valid pixels, between the plurality of the pixels values of the valid pixels.

* * * * *